(12) United States Patent
Teas

(10) Patent No.: US 9,373,827 B2
(45) Date of Patent: Jun. 21, 2016

(54) BATTERY COMPARTMENT INSERT

(71) Applicant: Paul Teas, California, MD (US)

(72) Inventor: Paul Teas, California, MD (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 197 days.

(21) Appl. No.: 14/336,199

(22) Filed: Jul. 21, 2014

(65) Prior Publication Data
US 2016/0020441 A1  Jan. 21, 2016

(51) Int. Cl.
*H01M 10/02*  (2006.01)
*H01M 2/10*  (2006.01)

(52) U.S. Cl.
CPC ..................... *H01M 2/105* (2013.01)

(58) Field of Classification Search
CPC ..................................... H01M 10/02
See application file for complete search history.

(56) References Cited

U.S. PATENT DOCUMENTS

2009/0239134 A1*  9/2009  Tseng ............... H01M 2/105
429/100

\* cited by examiner

*Primary Examiner* — Jacob Marks
(74) *Attorney, Agent, or Firm* — Mark O. Glut; NAWCAD

(57) ABSTRACT

A battery compartment insert for use with a battery holder that utilizes an assembly of two cells sealed in shrink wrap, thus replacing the need for use of the battery assembly. The insert includes a battery compartment lid for holding two separate lithium bromide battery cells and four electrical contacts. There are two electrical contacts corresponding to each battery cell. The battery compartment lid includes two diodes each corresponding to one of the battery cells and guide posts such that each individual battery cell can be taken out and replaced. The battery compartment lid corresponds to the battery holder such that two electrical contacts are each able to electrically communicate with a corresponding battery cell such that a device may be powered by the battery cells.

2 Claims, 2 Drawing Sheets

BATTERY COMPARTMENT INSERT

STATEMENT OF GOVERNMENT INTEREST

The invention described herein may be manufactured and used by or for the Government of the United States of America for governmental purposes without payment of any royalties thereon or therefor.

BACKGROUND

Common digital transponders (CXP) for IFF (Identification friend or foe, an electronic radio-based identification system) systems utilize a non-rechargeable battery pack. This is particularly true for navy aircraft, ships, and vehicles. Replacement of this battery pack is cumbersome, requires training, and causes unnecessary battery-related tampers. This in turn often interferes with mission capability and is expensive. Currently the cost of one non-rechargeable battery part is over $125.

Currently the Navy utilizes the RT-1912C/APX transponder which utilizes a battery pack that is an assembly of two lithium bromide AA cells that are sealed in shrink wrap. A pair of wires emanate from the pack. The wires form a harness that terminates at a miniature 2-pin connection. To replace the battery pack, a user must loosen several screws, lift the battery cover, disconnect the battery pack from the internal cable harness, then connect the new battery pack to the internal cable harness via the 2-pin connection. During this procedure, there is a risk of improper connection and/or damaging the pair of wires. Also during the course of changing the battery pack there is significant battery-related loss of Quadrant Key Encryption (QKEK).

A battery compartment insert is needed to eliminate the need to use expensive battery packs allowing use of easy to insert individual batteries and allow quick replacement of the batteries.

SUMMARY

The present invention is directed to a battery compartment insert with the needs enumerated above and below.

The present invention is directed to a battery compartment insert for use with a battery holder that can hold an assembly of two cells. The battery compartment insert includes a battery compartment lid for holding two separate lithium bromide battery cells and two electrical contacts. The battery compartment lid includes two diodes, each corresponding to one of the battery cells, and guide posts such that each individual battery cell can be taken out and replaced. The battery compartment lid corresponds to the battery holder such that the two electrical contacts are each able to electrically communicate with a corresponding battery cell such that a device may be powered by the battery cells.

It is a feature of the present invention to provide a battery compartment insert that eliminates the need for a non-rechargeable battery pack.

It is a feature of the present invention to provide a battery compartment insert that allows use of standard sized batteries (particularly AA non-rechargeable lithium bromide) in equipment that currently utilizes battery packs.

DRAWINGS

These and other features, aspects and advantages of the present invention will become better understood with reference to the following description and appended claims, and accompanying drawings wherein:

DESCRIPTION

Figure 1:
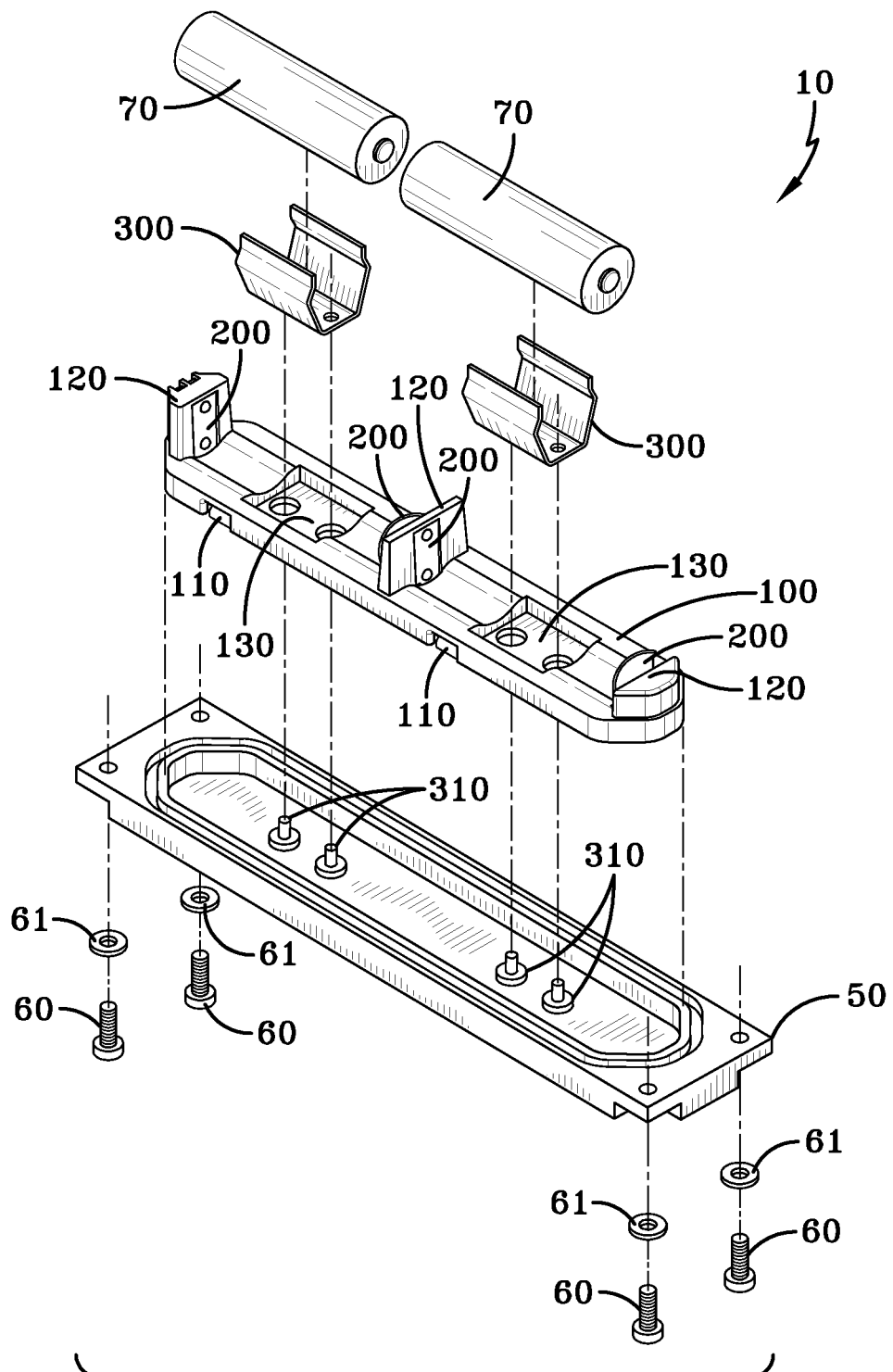
FIG. 1 is an exploded perspective view of the battery compartment insert.
Figure 2:
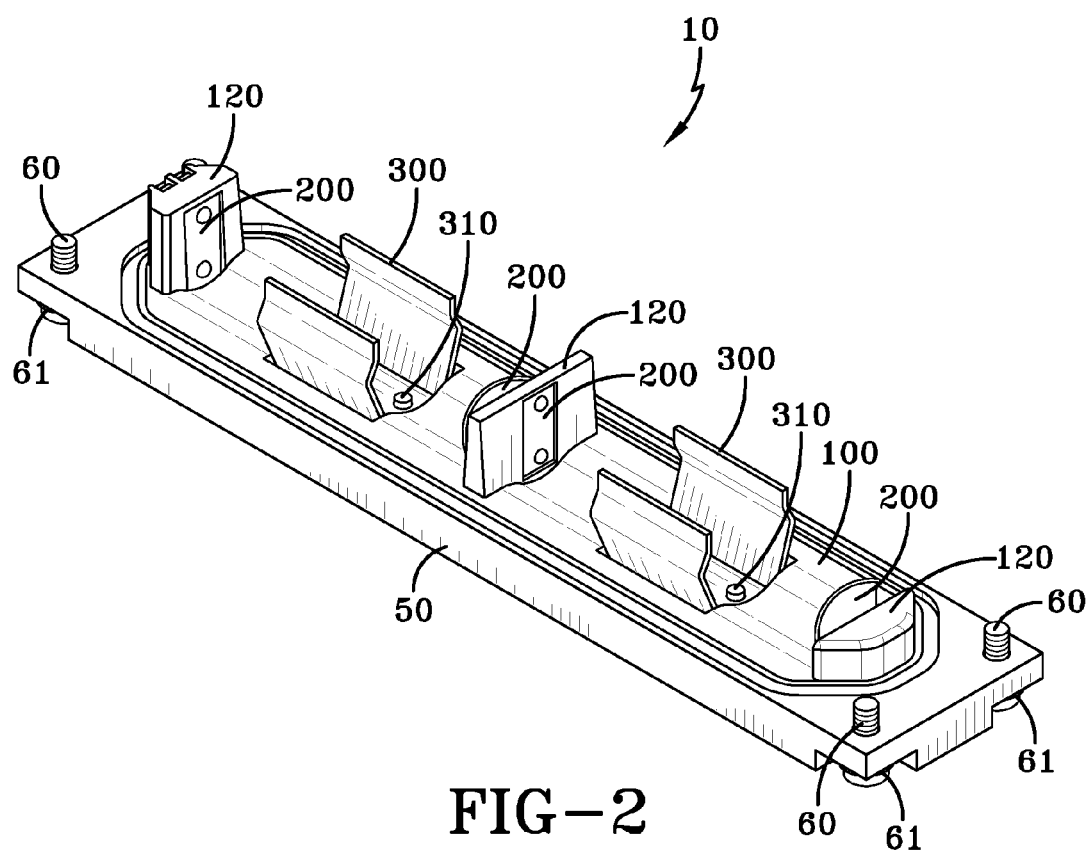
FIG. 2 is a perspective view of the battery compartment insert.

The preferred embodiments of the present invention are illustrated by way of example below and in FIGS. 1-2. As shown in FIG. 1, the battery compartment insert 10 is for use with a battery holder that utilizes an assembly of two cells sealed in shrink wrap, thus replacing the need for use of the battery assembly. The insert 10 includes a battery compartment lid 100 for holding two separate lithium bromide battery cells 70 (thereby eliminating the need for a battery assembly) and four electrical contacts 200. As shown in FIG. 1, there are two electrical contacts 200 corresponding to each battery cell 70. The battery compartment lid 100 includes two diodes 110 each corresponding to one of the battery cells and guide posts 120 such that each individual battery cell can be taken out and replaced. The battery compartment lid 100 corresponds to the battery holder 50 such that two electrical contacts 200 are each able to electrically communicate with a corresponding battery cell 70 such that a device may be powered by the battery cells 70.

In the description of the present invention, the invention will be discussed in an aircraft and ship environment; however, this invention can be utilized for any type of application that requires use of a battery.

In one of the embodiments of the invention, the battery compartment insert 10 may also include battery clips 300 for holding the individual battery cells 70 in place such that electrical communication is maintained. Each battery clip 300 may be positioned and correspond to a battery clip cutout 130. As shown in FIG. 1, each battery clip is disposed on the battery compartment lid 100 within a corresponding battery clip cutout 130. The battery clips 300 may be fastened to the battery compartment 100 via battery clip screws 310, or any type of fastener practicable.

The battery compartment insert 10 may be fastened to the mechanism being powered or any other item via holder-lid rivets 60 used in conjunction with a washer 61. However, any type of alternative type of fastener may be utilized. As shown in FIG. 1, the battery holder 50 may have a rectangular shape, with the fasteners disposed near the corners of the battery holder 50.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A battery compartment insert for use with a lithium bromide battery holder that can hold two lithium bromide cells, the insert comprising:

a battery compartment lid for holding two separate lithium bromide battery cells, the lid including two diodes corresponding to each of the battery cells, the lid including guide posts such that each individual battery cell can be taken out and replaced; and four electrical contacts, the battery compartment lid corresponding to the battery holder such that two electrical contacts are able to electrically communicate with a corresponding battery cell such that a device may be powered by the battery cells.

2. The battery compartment insert of claim 1 wherein the insert further comprises battery clips for holding the individual battery cells in place such that electrical communication is maintained.

\* \* \* \* \*